United States Patent [19]
O'Malley

[11] Patent Number: 5,594,437
[45] Date of Patent: Jan. 14, 1997

[54] CIRCUIT AND METHOD OF UNPACKING A SERIAL BITSTREAM

[75] Inventor: Patrick J. O'Malley, Chandler, Ariz.

[73] Assignee: Motorola, Inc., Schaumburg, Ill.

[21] Appl. No.: 283,350

[22] Filed: Aug. 1, 1994

[51] Int. Cl.[6] .................................................. G06F 7/20
[52] U.S. Cl. ........................... 341/67; 341/65; 341/100
[58] Field of Search .............................. 341/60, 67, 65, 341/100, 87

[56] References Cited

U.S. PATENT DOCUMENTS

| | | | |
|---|---|---|---|
| 5,434,568 | 7/1995 | Moll | 341/87 |
| 5,488,366 | 1/1996 | Wu | 341/67 |

*Primary Examiner*—Brian K. Young
*Assistant Examiner*—Peguy JeanPierre

*Attorney, Agent, or Firm*—Robert D. Atkins; Jeffrey D. Nehr

[57] ABSTRACT

A bit stream unpacking circuit (10) parses data fields from a serial bitstream as an initial step in decompression. The protocol of the incoming packed data stream is stored in a control ROM (24). As each packed data field arrives, the control ROM provides size and condition instructions (18) to parse out the fields from the serial data stream and store the fields in data storage (14) for later retrieval. The size instruction determines the length of the field in the incoming data. A counter (26) counts clock signals of the incoming serial bitstream and matches the count with the size instruction to determine when a data field has arrived. The condition instruction determines the next address in the control ROM based on the incoming bitstream. Once the incoming message has been parse out and stored, the individual data field may be read directly from the data storage for decompression.

19 Claims, 1 Drawing Sheet

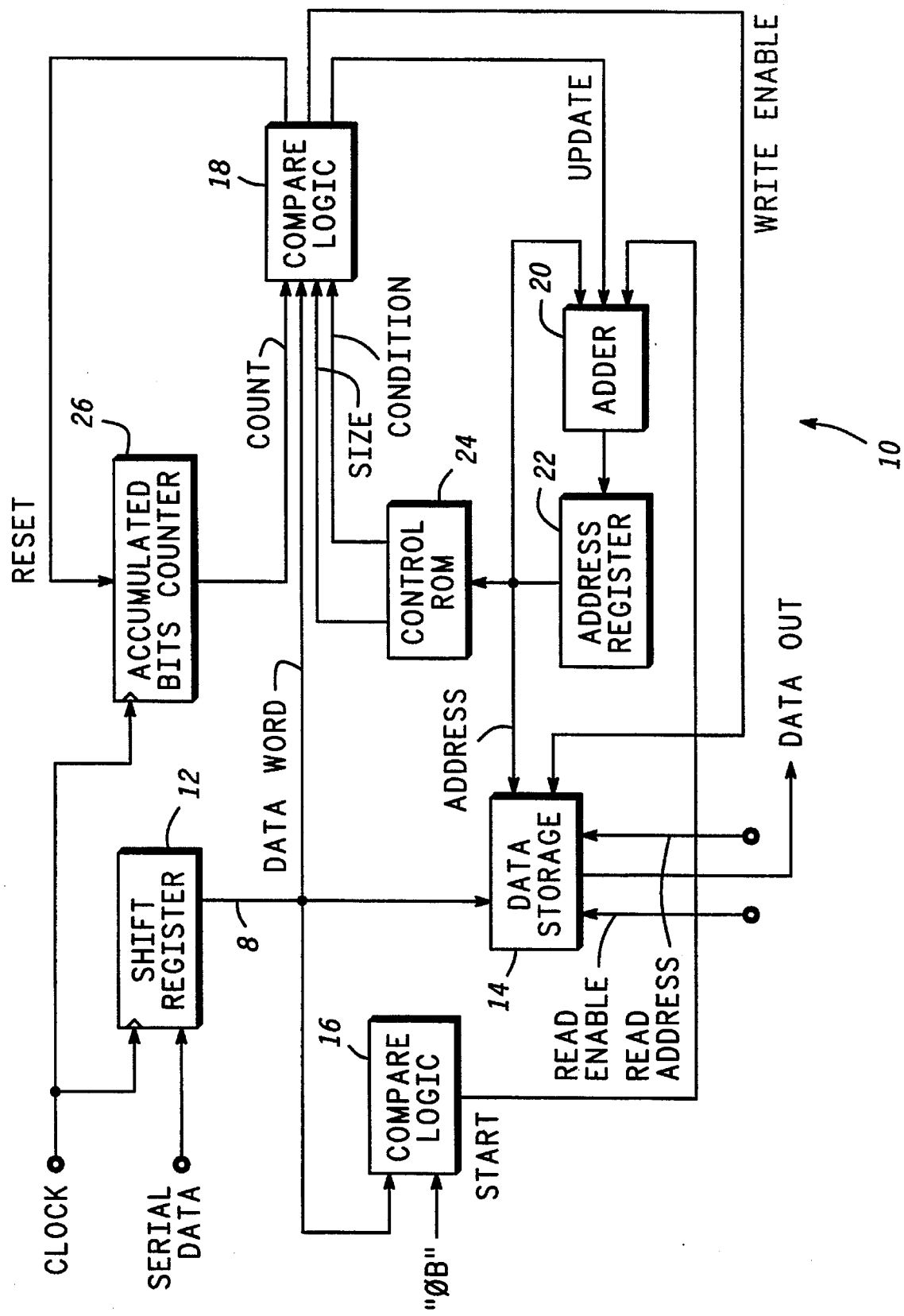

CIRCUIT AND METHOD OF UNPACKING A SERIAL BITSTREAM

BACKGROUND OF THE INVENTION

The present invention relates in general to data communication and, more particularly, to a bit unpacker for parsing out packed data.

In data communication systems, digital data is often transmitted in a compressed format, i.e. encoded to reduce redundant or repetitive information. The multi-bit data words are packed and compressed to remove redundancy and converted into a serial bitstream prior to transmission. The data communication is made more efficient by transmitting fewer total bits. The packed and compressed data must be unpacked and decompressed at the receiving end, and typically converted back to multiple bit words, for use in conventional digital logic.

In the prior art, the bitstream is often arranged on byte or word boundaries for the convenience of the receiving hardware. However, not all of the bits in each byte or word are necessarily used. Therefore, some wasted space occurs with the bitstream arranged on byte or word boundaries.

Other prior art techniques have attempted to use all available space in the bitstream by avoiding sending unused bits. When the packing algorithm finds an unused bit, it skips to the next used bit in the message. On the receiving side, the unpacking process becomes more complex as data boundaries are no longer convenient on a byte or word basis. The meaning of each subsequent bit cannot be determined until the previous bits has been unpacked and interpreted to determine what comes next. The receiving logic often uses a microprocessor executing complex algorithms to perform the unpacking and decoding. The microprocessor solution adds complexity that could be avoided. Once the data is reformed into its original uncompressed fields, the data is available for the end use logic circuitry.

Hence, a need exists to unpack the data as it arrives prior to full decompression.

BRIEF DESCRIPTION OF THE DRAWING

The sole FIGURE is a block diagram illustrating a bit unpacking circuit.

DETAILED DESCRIPTION OF THE PREFERRED EMBODIMENT

Referring to the sole figure, a bitstream unpacking circuit 10 is shown suitable for manufacturing as an integrated circuit using conventional integrated circuit processes. A packed bitstream SERIAL DATA is applied to a data input of shift register 12. The clock input of shift register 12 receives a CLOCK signal operating at 27 MHz. The CLOCK signal occurs for each new bit of SERIAL DATA. Shift register 12 performs a serial-to-parallel conversion for providing an up to 8-bit DATA WORD at its parallel output. A data storage circuit 14, for example an arrangement of addressable registers or a RAM circuit, receives the DATA WORD from shift register 12. The DATA WORD is also applied to a first input of compare logic 16, and to a first input of compare logic 18. A second input of compare logic 16 receives a fixed 8-bit data word "0B" (hexadecimal). The output of compare logic 16 provides a START control signal to a first input of digital adder 20, while an UPDATE control signal from compare logic 18 is applied at a second input of digital adder 20. The output of digital adder 20 is coupled to a data input of address register 22. The ADDRESS signal from address register 22 is coupled to a third input of digital adder 20, to an address input of control ROM 24, and to a write address input of data storage 14. Control ROM 24 provides a SIZE signal and a CONDITION signal to compare logic 18 from one of its storage locations based on the ADDRESS signal. A second output of compare logic 18 provides a WRITE ENABLE signal to data storage 14. The RESET output of compare logic 18 is coupled to a reset input of accumulated bits counter 26. Accumulated bits counter 26 is clocked by the CLOCK signal and provides a COUNT signal to a fourth input of compare logic 18.

A feature of the present invention is that bit unpacking circuit 10 unpacks the SERIAL DATA stream on the fly as it arrives rather than waiting for complete reception as is common in the prior art. The protocol and format of the incoming SERIAL DATA is stored in control ROM 24. An example of the control ROM 24 organization is shown in Table 1. The address field indicates the ROM address. The state field is a description of the ROM address. The size field provides the number of bits that compare logic 18 is looking for in the incoming data field, while the condition field provides the next instruction based on the received DATA once the specified number of bits have been received.

The present invention is applicable to any predefined protocol. The format stored in control ROM 24 allows bit unpacking circuit 10 to parse out the SERIAL DATA bitstream into predetermined fields that can be understood by subsequent decompressing logic (not shown). While Table 1 gives one example of different types of operations that can be performed with bit unpacking circuit 10, a more complete protocol typically includes additional unpacking codes.

TABLE 1

| Address | State | Size | Condition |
| --- | --- | --- | --- |
| 0 | idle | 0 | 0 |
| 1 | id code | 5 | add one |
| 2 | language code flag | 1 | "0" - add one "1"- add two |
| 3 | language code | 3 | add one |
| 4 | channel code flag | 2 | "00" - add one "01" - add two "10" - add three "11" - add four |
| 5 | first channel code | 7 | add one |
| 6 | second channel code | 7 | add one |
| 7 | third channel code | 7 | add one |
| 8 | additional codes . . . | | |

In the idle state, bit unpacking circuit 10 waits for an "0B" data word in shift register 12 indicating the start of message transmission. Address register 22 begins with value zero ADDRESS that points to the zero address location in control ROM 24. The zero address in control ROM 24 is the idle state indicating no activity. All three inputs to digital adder 20 are zero. The SIZE and CONDITION are both zero, and the RESET signal is asserted as logic one holding accumulated bits counter 26 in an inactive state and the COUNT signal at zero.

When an "0B" DATA word is shifted into the eight bit locations of shift register 12, the START signal from compare logic 16 goes to a value of one which is summed with the zeroes still applied to the other inputs of digital adder 20. A value of one is stored in address register 22 that points to address location one in control ROM 24. Once the next bit from the SERIAL DATA shifts into shift register 12 its contents is no longer "0B". The START signal returns to a value of zero. The RESET control signal goes to logic zero to release the reset input of accumulated bits counter 26 allowing it to count CLOCK signals.

At address location one in Table 1, control ROM 24 stores an id code field that indicates the type of unpacking protocol and possibly a revision designator. The id code allows control ROM 24 to store more than one type and/or reversion of unpacking protocol. In the present example, the id code field is a 5-bit value, i.e. the value of SIZE. The CONDITION instruction is a value one indicating that the instruction increments address register 22 by one after the five SERIAL DATA bits for the id code are received and processed. When accumulated bits counter 26 has counted to five, it matches the SIZE control signal to indicate that the id code is in the five least significant locations of shift register 12. Compare logic 18 toggles the WRITE ENABLE line and stores the id code in data storage 14 as determined by the ADDRESS signal, i.e. address location one. The id code has thus been parsed out from the SERIAL DATA stream and stored for later retrieval. Compare logic 18 provides a value one UPDATE control signal to digital adder 20 based on the CONDITION instruction from Table 1. The previous value of address register 22, i.e. value one, is added with the value one UPDATE signal in digital adder 20 and the resulting value two is stored in address register 22. The RESET control signal pulses to logic one to reset accumulated bits counter 26 to zeroes. Compare logic 18 includes combinational logic to compare digital signals and pass instructions given by control ROM 24. Such combinational logic can be implemented from the prior description.

Address register 22 now points to address location two in control ROM 24. At address location two in Table 1, control ROM 24 stores a 1-bit language code flag that indicates whether or not a language code field follows. The language code field may provide information on the type of language in the message, e.g. English, Spanish, French, etc. However, the language code is not always transmitted. The SIZE field is value one and the CONDITION instruction increments address register 22 by one or two based on the contents of the language code flag in shift register 12. After one CLOCK signal, accumulated bits counter 26 has a count value of one, and the least significant bit location of shift register 12 contains the language code flag. The language code flag in the DATA WORD is made available to compare logic 18. At that point, the COUNT signal from accumulated bits counter 26 matches the SIZE signal into compare logic 18. Compare logic 18 toggles the WRITE ENABLE line and stores the language code flag in data storage 14 as determined by the ADDRESS signal, i.e. address location two. If the language code flag is value "0", then the language code field follows and the instruction increments address register 22 by one. If the language code flag is value "1" then the next DATA bits are not the language code field and address register 22 increments by two to skip over the language code field entry in control ROM 24.

Assume that the language code flag is value "0". Compare logic 18 provides the UPDATE control signal to increment digital adder 20 by one. The previous value of address register 22, i.e. value two, is added with the value one UPDATE control signal in digital adder 20 and the resulting value three is stored in address register 22. The RESET control signal pulses to logic one to reset accumulated bits counter 26 to zeroes. At address location three in Table 1, control ROM 24 contains a SIZE value of three, and a CONDITION instruction to increment address register 22 by one. After three CLOCK signals, accumulated bits counter 26 has a count value of three, and the three least significant bit locations of shift register 12 contain the language code. The COUNT signal from accumulated bits counter 26 matches the SIZE signal whereby compare logic 18 toggles the WRITE ENABLE line and stores the language code field in data storage 14 as determined by the ADDRESS signal, i.e. address location three. The language code has thus been parsed out from the SERIAL DATA stream and stored for later retrieval. Compare logic 18 provides the UPDATE control signal to increment address register 22 by one. The previous value of address register 22, i.e. value three, is added with the value one UPDATE control signal in digital adder 20 and the resulting value four is stored in address register 22. The RESET control signal pulses to logic one to reset accumulated bits counter 26 to zeroes.

Alternately, if the language code flag is value "1", compare logic 18 provides the UPDATE control signal to digital adder 20 to increment address register 22 by two. The previous value of address register 22, i.e. value two, is added with the value two UPDATE control signal in digital adder 20 to skip over the language code field entry in control ROM 24. The resulting value four is stored in address register 22. The RESET control signal pulses to logic one to reset accumulated bits counter 26 to zeroes. Again, compare logic 18 includes combinational logic to compare digital signals and pass instructions given by control ROM 24. Such combinational logic can be implemented from the afore-described operations.

Address register 22 now points to address location four in control ROM 24. At address location four in Table 1, control ROM 24 stores a 2-bit channel code flag that indicates whether or not one or more channel code fields follow. The channel code field provides information on the number of channels encoded in the serial bitstream. However, the channel code is not always transmitted under a given protocol. The SIZE field is value two and the CONDITION instruction increments address register 22 by one, two, three or four based on the contents of the channel code flag in shift register 12. After two CLOCK signals, accumulated bits counter 26 has a count value of two, and the two least significant bit locations of shift register 12 contain the channel code flag. The channel code flag in the DATA WORD is made available to compare logic 18. At that point, the COUNT signal from accumulated bits counter 26 matches the SIZE signal into compare logic 18. Compare logic 18 toggles the WRITE ENABLE line and stores the channel code flag in data storage 14 as determined by the ADDRESS signal, i.e. address location four.

If the channel code flag is value "00", then three channel code fields follow and the instruction increments address register 22 by one. If the channel code flag is value "01", then two channel code fields follow and the instruction increments address register 22 by two. If the channel code flag is value "10", then one channel code field follows and the instruction increments address register 22 by three. If the channel code flag is value "11" then the next DATA bits are not any channel code field and address register 22 increments by four to skip over all three channel code field entries in control ROM 24.

Assume that the channel code flag is value "00". Compare logic 18 provides the UPDATE control signal to increment address register 22 by one. The previous value of address register 22, i.e. value four, is added with the value one UPDATE control signal in digital adder 20 and the resulting value five is stored in address register 22. The RESET control signal pulses to logic one to reset accumulated bits counter 26 to zeroes. At address location five in Table 1, control ROM 24 contains a SIZE value of seven, and a CONDITION instruction to increment address register 22 by one. After seven CLOCK signals, accumulated bits counter 26 has a count value of seven, and the seven least significant bit locations of shift register 12 contain the first channel code. The COUNT signal from accumulated bits counter 26 matches the SIZE signal into compare logic 18 which toggles the WRITE ENABLE line and stores the first channel code field in data storage 14 as determined by the ADDRESS signal, i.e. address location five. Compare logic 18 provides the UPDATE control signal to digital adder 20 to increment address register 22 by one. The previous value of address register 22, i.e. value five, is added with the value one UPDATE control signal in digital adder 20 and the resulting value six is stored in address register 22. The RESET control signal pulses to logic one to reset accumulated bits counter 26 to zeroes.

At address location six in Table 1, control ROM 24 contains a SIZE value of seven, and a CONDITION instruction to increment address register 22 by one. After seven CLOCK signals, accumulated bits counter 26 has a count value of seven, and the seven least significant bit locations of shift register 12 contain the second channel code. The COUNT signal from accumulated bits counter 26 matches the SIZE signal into compare logic 18 which toggles the WRITE ENABLE line and stores the second channel code field in data storage 14 as determined by the ADDRESS signal, i.e. address location six. Compare logic 18 provides the UPDATE control signal to digital adder 20 to increment address register 22 by one. The previous value of address register 22, i.e. value six, is added with the value one UPDATE control signal in digital adder 20 and the resulting value seven is stored in address register 22. The RESET control signal pulses to logic one to reset accumulated bits counter 26 to zeroes.

At address location seven in Table 1, control ROM 24 contains a SIZE value of seven, and a CONDITION instruction to increment address register 22 by one. After seven CLOCK signals, accumulated bits counter 26 has a count value of seven, and the seven least significant bit locations of shift register 12 contain the third channel code. The COUNT signal from accumulated bits counter 26 matches the SIZE signal into compare logic 18 which toggles the WRITE ENABLE line and stores the third channel code field in data storage 14 as determined by the ADDRESS signal, i.e. address location seven. The first, second and third channel codes have thus been parsed out from the SERIAL DATA stream and stored for later retrieval. Compare logic 18 provides the UPDATE control signal to digital adder 20 to increment address register 22 by one. The previous value of address register 22, i.e. value seven, is added with the value one UPDATE control signal in digital adder 20 and the resulting value eight is stored in address register 22. The RESET control signal pulses to logic one to reset accumulated bits counter 26 to zeroes.

Alternately, if the channel code flag is value "01", compare logic 18 provides the UPDATE control signal to digital adder 20 to increment address register 22 by one. The previous value of address register 22, i.e. value four, is added with the value two UPDATE control signal in digital adder 20 and the resulting value six is stored in address register 22. The RESET control signal pulses to logic one to reset accumulated bits counter 26 to zeroes. Address register 22 starts at location six and increments to value seven and then to value eight. The second and third channel codes are consecutively received in shift register 12 and stored in data storage 14 as described above.

If the channel code flag is value "10", compare logic 18 provides the UPDATE control signal to digital adder 20 to increment address register 22 by one. The previous value of address register 22, i.e. value four, is added with the value three UPDATE control signal in digital adder 20 and the resulting value seven is stored in address register 22. The RESET control signal pulses to logic one to reset accumulated bits counter 26 to zeroes. Address register 22 starts at location seven and increments to value eight. The third channel code is received in shift register 12 and stored in data storage 14 as described above.

If the channel code flag is value "11", compare logic 18 provides the UPDATE control signal to digital adder 20 to increment address register 22 by one. The previous value of address register 22, i.e. value four, is added with the value four UPDATE control signal in digital adder 20 and the resulting value eight is stored in address register 22. The RESET control signal pulses to logic one to reset accumulated bits counter 26 to zeroes. Address register 22 points to the next protocol field in control ROM 24 to continue the unpacking process. Again, compare logic 18 includes combinational logic to compare digital signals and pass instructions given by control ROM 24. Such combinational logic can be implemented from the aforedescribed operations.

As described above, control ROM 24 may store a relative jump instruction where the CONDITION field stores a value by which to increment the contents of address register 22 and jump to another address location in control ROM 24. In another type of CONDITION instruction, control ROM 24 may store an absolute jump instruction where the CONDITION field stores the next absolute address. Thus instead of incrementing the previous address as described above, the absolute jump instruction replaces the value in address register 22 with a new address. To execute the absolute jump instruction, the CONDITION instruction passing through compare logic 18 would bypass digital adder 20 (not shown) directly into address register 22.

Once the incoming message is completely unpacked into individual fields and stored in data storage 14, or possibly during the unpacking process, a decompression circuit addresses data storage 14 via the READ ADDRESS and READ ENABLE signals. The individual data fields are made available from DATA OUT and may be decompressed for use by conventional digital logic.

By now it should be appreciated that the present invention provides a circuit and method of unpacking a serial bitstream prior to decompression. The protocol of the incoming packed data stream is stored in the control ROM. As each packed data field arrives, the control ROM provides size and condition instructions to parse out the fields from the SERIAL DATA stream and store the fields in a data storage circuit for later retrieval. The size instruction determines the length of the field in the incoming data. A counter counts clock signals of the incoming serial bitstream and matches the count with the size instruction to determine when a data field has arrived. The condition instruction determines the next address in the control ROM based on the incoming data. Once the incoming message has been parsed out and stored, the individual data fields may be read directly from the data storage for decompression. The data is efficiently unpacked as it arrives, without the complexity of a full decompression, by storing the packing protocol at the receiving end.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A bitstream unpacking circuit, comprising:

a shift register having a serial input, a clock input and a parallel output, said serial input being coupled for receiving a serial data stream, said clock input being coupled for receiving a clock signal;

a data storage circuit having a data input coupled to said parallel output of said shift register;

a counter having a clock input, a reset input and an output, said clock input being coupled for receiving said clock signal, said output providing a count value;

first means coupled for receiving said parallel output, said count value, a size control signal and a condition control signal, said first means comparing said count value to a first value of said size control signal and generating a reset control signal and an update control signal upon detecting a match, said reset control signal being applied to said reset input of said counter to reset said counter upon detecting said match, said update control signal having a value determined by a first value of said condition control signal; and second means coupled for receiving said update control signal and generating a second value of said size control signal and a second value of said condition control signal in response to said update control signal.

2. The bitstream unpacking circuit of claim 1 wherein said second means includes:

an adder having first and second inputs and an output, said first input being coupled for receiving said update control signal;

an address register having an input coupled to said output of said adder and having an output for providing an address signal; and a control ROM having an address input coupled to said output of said address register and having outputs for providing said size control signal and said condition control signal retrieved from a plurality of storage locations based on said address signal.

3. The bitstream unpacking circuit of claim 2 wherein said data storage circuit includes an address input coupled for receiving said address signal from said address register.

4. The bitstream unpacking circuit of claim 3 wherein said second means further provides a write enable signal to a write enable input of said data storage circuit upon detecting said match between said count value and said size control signal.

5. The bitstream unpacking circuit of claim 4 wherein said update control signal takes on one of a plurality of predetermined values determined by said parallel output of said shift register.

6. The bitstream unpacking circuit of claim 5 further including compare logic having first and second inputs and an output, said first input being coupled to said parallel output of said shift register, said second input being coupled for receiving a data word, said output being coupled to a third input of said adder.

7. A method of unpacking a serial bitstream, comprising the steps of:

shifting a serial data stream into a register upon receiving a clock signal for providing a parallel data word;

counting a count value in response to said clock signal;

comparing said count value to a first value of a size control signal and generating a reset control signal upon detecting a match; and storing said parallel data word upon detecting said match.

8. The method of claim 7 further comprising the step of resetting said count value in response to said reset control signal.

9. The method of claim 8 further comprising the steps of:

providing a first value of a condition control signal;

generating an update control signal having a value determined by said first value of said condition control signal; and selecting a second value of said size control signal and a second value of said condition control signal based on said update control signal.

10. The method of claim 9 wherein said selecting step comprises the steps of:

adding said update control signal to an address signal for providing an updated address signal;

storing said updated address signal as said address signal; and addressing a storage location based on said address signal for providing a second value of said size control signal and a second value of said condition control signal.

11. The method of claim 10 further comprising the step of addressing a storage location for said parallel data word based on said address signal.

12. The method of claim 11 further comprising the step of providing a write enable signal to store said parallel data word upon detecting said match between said count value and said size control signal.

13. The method of claim 12 wherein said update control signal takes on one of a plurality of predetermined values as determined by said parallel data word.

14. The method of claim 13 further comprising the step of:

comparing said parallel data word to a fixed data word for providing a start control signal; and adding said start control signal with said address signal for providing said updated address signal.

15. A bitstream unpacking circuit, comprising:

a shift register having a serial input, a clock input and a parallel output, said serial input being coupled for receiving a data stream, said clock input being coupled for receiving a clock signal;

a data storage circuit having a data input coupled to said parallel output of said shift register;

a counter having a clock input, a reset input and an output, said clock input being coupled for receiving said clock signal, said output providing a count value;

first compare logic having first, second, third and fourth inputs, said first input being coupled to said parallel output, said second input being coupled for receiving said count value, said third input being coupled for receiving a size control signal, said fourth input being coupled for receiving a condition control signal, said first compare logic comparing said count value to a first value of said size control signal and generating a reset control signal and an update control signal upon detecting a match, said reset control signal being applied to said reset input of said counter to reset said counter upon detecting said match, said update control signal having a value determined by a first value of said condition control signal;

an adder having first and second inputs and an output, said first input being coupled for receiving said update control signal;

an address register having an input coupled to said output of said adder and having an output for providing an address signal; and a control ROM having an address input coupled to said output of said address register and having an output for providing said size control signal and said condition control signal from a plurality of storage locations based on said address signal.

16. The bitstream unpacking circuit of claim 15 wherein said data storage circuit includes an address input coupled for receiving said address signal from said address register.

17. The bitstream unpacking circuit of claim 16 wherein said first compare logic means further provides a write enable signal to a write enable input of said data storage circuit upon detecting said match between said count value and said size control signal.

18. The bitstream unpacking circuit of claim 17 wherein values of said update control signal takes on one of a plurality of values as determined by said parallel output of said shift register.

19. The bitstream unpacking circuit of claim 18 further including second compare logic having first and second inputs and an output, said first input being coupled to said parallel output of said shift register, said second input being coupled for receiving a data word, said output being coupled to a third input of said adder.

\* \* \* \* \*